United States Patent [19]
Wegehaupt et al.

[11] 3,855,171
[45] Dec. 17, 1974

[54] ORGANOPOLYSILOXANE COMPOSITIONS
[75] Inventors: Karl-Heinrich Wegehaupt, Burghausen; Gunther Kratel, Sankt Mang; Manfred Leiser, Burghausen, all of Germany
[73] Assignee: Wacker-Chemie GmbH, Munich, Germany
[22] Filed: May 1, 1972
[21] Appl. No.: 248,998

[52] U.S. Cl.......................... 260/37 SB, 260/46.5 R
[51] Int. Cl............................................. C08g 51/04
[58] Field of Search ...... 260/37 SB; 106/288 B, 299

[56] References Cited
UNITED STATES PATENTS

| | | | |
|---|---|---|---|
| 3,183,206 | 5/1965 | Kniege et al. | 260/37 SB |
| 3,350,344 | 10/1967 | Beers | 260/37 SB |
| 3,505,278 | 4/1970 | Elarde et al. | 260/37 SB |
| 3,525,707 | 8/1970 | Bobear | 260/37 SB |

*Primary Examiner*—Lewis T. Jacobs
*Attorney, Agent, or Firm*—Marion D. Ford

[57] ABSTRACT

This invention relates to compositions containing organopolysiloxanes and pyrogenically produced mixed oxides of boron and an element selected from the class consisting of silicon, aluminum, titanium and iron in which the boron calculated as elemental boron is present in an amount of from 2 to 20 percent by weight. These compositions may be used in the preparation of self-adhering elastomers and putty-like materials which exhibit a high degree of elasticity under suddenly applied stress.

16 Claims, No Drawings

ORGANOPOLYSILOXANE COMPOSITIONS

The present invention relates to compositions containing modified organopolysiloxanes and more particularly to compositions containing an organopolysiloxane and pyrogenically produced mixed oxides of boron with silicon, aluminum, titanium and/or iron.

Boron compounds such as boric acid, boric acid anhydride and alkyl borates have been incorporated in siloxane elastomers to improve handling and impart self-adhesion properties thereto. These elastomers have been used in the manufacture of self-adherent silicone rubber tapes which are particularly useful in providing electrical and thermal insulation.

in addition, compositions based on mixtures of diorganopolysiloxanes and boron compound are in demand for the manufacture of resilient deformable materials commonly referred to as "bouncing putty." These materials exhibit a high degree of elasticity under suddenly applied stress.

Many of the boron compounds used heretofore in the organopolysiloxane compositions were toxic and/or were ignited easily by sparks caused by electrostatic charges during the mixing of the compositions. In addition, when volatile and/or liquid boron compounds were employed in these compositions the boron concentration fluctuated to a great extent due to evaporation of the volatile materials during the manufacture or curing of the elastomers. Also when boric acid or boron nitride were used in these compositions, agglomerates were often formed which produced so-called "nibs," i.e. areas of different optical density and different electrical properties.

Self-adhering tapes made from compositions known heretofore have relatively short shelf-like. The residual tackiness is lost after a few weeks of storage at room temperature. In addition, self-adhering tapes based on diorganopolysiloxane polymers and alkyl borates required interleaving during storage. For example, if a self-adhering tape is stored rolled in the usual fashion for storing tapes, the self-adhesion properties are as active in storage as in use and the roll soon becomes a useless unit of a mass with each layer of tape firmly bonded to the preceding layer and the succedent layer. Consequently it can readily be seen the use of an interleaving sheet in such tapes is absolutely necessary and the interleaving sheet must be removed and disposed of during the application of the tape.

Therefore it is an object of this invention to provide a boron containing organopolysiloxane composition. Another object of this invention is to provide a composition which utilizes nontoxic boron compounds. Another object of this invention is to provide a composition which may be used in the manufacture of self-adherent tapes. Still another object of this invention is to provide self-adherent tapes which retain their adhesive properties for a prolonged period of time. A further object of this invention is to provide a composition which exhibits a high degree of elasticity under suddenly applied stress. A still further object of this invention is to provide a composition having uniform optical density and electrical insulating properties.

The foregoing objects and others which will become apparent in the following description are accomplished in accordance with this invention, generally speaking, by providing a composition which comprises an organopolysiloxane and pyrogenically produced mixed oxides of boron and an element selected from the class consisting of silicon, aluminum, titanium and iron, in which the boron calculated as elemental boron is present in an amount of from 2 to 20 percent by weight.

Preferably, the mixed oxides used in the compositions of this invention contain from 5 to 10 percent by weight of boron, calculated as elemental boron.

Because of their availability, mixed oxides of boron and silicon are preferred.

The pyrogenically produced mixed oxides of this invention are prepared by any conventional process known in the art, such as that described in "Ullmanns Encyklopadie der technischen Chemie," Munich-Berlin 1964, page 726. For example, the mixed oxides are prepared by combustion of boron and/or oxidizable boron compounds with silicon, aluminum, titanium or iron or oxidizable compounds thereof in the presence of a flame and water, if desired. In other words, these mixed oxides may be prepared by contacting these metals and metalloids or compounds of said metals or metalloids in a flame at temperatures above about 800°C. in the presence of water. These materials may be in a solid, liquid or a vapor state when subjected to flame combustion.

The mixed oxides employed in this invention are preferably prepared from volatile compounds of boron and silicon, aluminum, titanium and/or iron, especially the chlorides of said elements, in the presence of water formed in situ, at temperatures above about 800°C. by the so-called flame hydrolysis technique. The mixed oxides produced pyrogenically in the gas phase have a surface area of from about 100 to 400 m²/g (measured by nitrogen absorption in accordance with the method described in ASTM Special Technical Bulletin No. 51, 1941, page 95 and thereafter, also known as the "BET Method").

The amount of mixed oxides incorporated in the compositions of this invention are dependent on the intended use of the particular composition. If the composition is to be used to form elastomers, (see U.S. Pat. No. 2,721,857) then amounts of from 0.005 to 0.09 percent by weight of boron, calculated as boric acid anhydride and based on the weight of the organopolysiloxane may be used. However, if the composition is to be used in the preparation of self-adhering elastomers "bouncing putties" then about 0.5 to 20 percent by weight of boron, calculated as elemental boron is generally incorporated therein.

The organopolysiloxanes in the compositions of this invention generally contain at least about 80 percent by weight of diorganopolysiloxanes, having the general formula

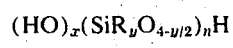

$(HO)_x(SiR_yO_{4-y/2})_nH$ in which R denotes monovalent hydrocarbon radicals and substituted monovalent hydrocarbon radicals, $x$ has an average value of from 0.99 to 1.01, $y$ has an average value of from 1.99 to 2.01, the sum of $x + y$ is 3 and $n$ is an integer having a value of at least 3 and more preferably at least 50. If desired, the hydroxyl groups can be replaced at least partially by triorganosiloxy groups, especially trimethylsiloxy or dimethylvinylsiloxy groups, Si-bonded hydrogen atoms or by other groups which can be condensed with SiOH groups. Examples of such other reactive groups are radicals of the general formula RNH—, wherein R has the same definition as above, oxime groups or alkoxy groups. As indicated by the average value of $y$ above, i.e., 1.99 to 2.01, these diorganopolysiloxanes can also contain siloxane units having different degrees of substitution.

Examples of suitable hydrocarbon radicals represented by R above are alkyl radicals having from 1 to 18 carbon atoms, such as methyl, ethyl, isopropyl and octadecyl radicals; alkylene radicals, such as vinyl and allyl radicals; cycloaliphatic hydrocarbon radicals, such as cyclopentyl, cyclohexyl, cyclohexenyl and methylcyclohexyl radicals; aryl radicals, such as phenyl and xenyl radicals; aralkyl radicals, such as benzyl, beta-phenylethyl and beta-phenylpropyl radicals, and alkaryl radicals, such as tolyl radicals.

Examples of preferred substituted monovalent hydrocarbon radicals are halogenated hydrocarbon radicals, such as chloromethyl, 3,3,3-trifluoropropyl and $\alpha$, $\alpha$, $\alpha$-trifluorotolyl radicals, and cyanoalkyl radicals, such as the beta-cyanoethyl radicals.

Due to their availability, it is preferred that 50 percent of the number of R radicals represented above be methyl radicals. The remaining R radicals are preferably phenyl and/or vinyl radicals.

The R radicals on the individual silicon atoms can be the same, as in dimethylsiloxane units, or different, as vinylmethylsiloxane units. The organopolysiloxanes, which according to the invention are mixed with mixed oxides containing boron, can be homopolymers, copolymers, for example of dimethylsiloxane and methyphenylsiloxane units, or mixtures of different homopolymers and/or copolymers.

The viscosity of the organopolysiloxanes is generally in the range of from about 100 to $10 \times 10^6$ cs. at 25°C.

The compositions of this invention can be made by the conventional techniques known in the art, such as by mixing, for example, in kneading and/or milling machines.

The organopolysiloxanes can be mixed either alone or together with the mixed oxides containing boron with other additives which are desirable for the particular end use of the compositions, such as for the preparation of "bouncing putties" or for compositions which can be cured to solid elastomers. Examples of such additives are fillers, condensation catalysts or catalysts which promote the splitting of siloxane bonds, such as iron-III chloride, cross-linking agents or curing agents, agents for preventing stiffening, agents for reducing the permanent set, oxidation inhibitors, pigments, soluble dyestuffs and scents. Other additives which may be incorporated in the compositions of this invention are plasticizers, such as trimethylsiloxy end-blocked dimethylpolysiloxanes having a viscosity of less than 1,000 cs. at 25°C., or oleic acid, lubricants and polyglycols which may be etherified and/or esterified, including organopolysiloxane-polyoxyalkylene copolymers, and additives which impart conductivity, such as graphite.

Fillers which may be incorporated in these compositions are so-called reinforcing fillers, i.e., fillers having a surface area of at least 50 m²/g, such as pyrogenically produced silicon dioxide, zinc oxide, titanium dioxide, aluminum oxide or iron oxide; dehydrated silicic acid hydrogels; silica aerogels; precipitated silicon dioxide having a surface area of least 50 m²/g; and lamp black. Non-reinforcing fillers, i.e., fillers having a surface area of less than 50 m²/g, or pigments may also be incorporated in these compositions. Examples of non-reinforcing fillers are titanium dioxide, aluminum oxide, zinc oxide and iron oxide, having a surface area of less than 50 m²/g, copper phthalocyanine, quartz powder, clays, glass powders and diatomaceous earth. Other fillers are for example glass fibres and polytetrafluoroethylene. In addition, the fillers may be treated with organosilicon compounds in a known manner to provide fillers having organosiloxy groups on their surface.

When elastomers, especially self-adhering elastomers, are prepared from the compositions of this invention, then cross-linking agents or curing agents are essential ingredients of these compositions.

Examples of cross-linking agents or curing agents which may be employed are peroxidic compounds, such as benzoyl peroxide, bis-dichlorobenzoyl peroxide, bis tert-butyl peroxide and dicumyl peroxide, and other radical-forming agents, such as azodiisobutyrodinitrile. Generally when the peroxidic compounds are used, heat is required to convert these compositions into an elastomeric material. In addition to the above-mentioned radical-forming agents, these compositions can be converted to elastomers by ionising radiation, for example by a Van de Graaff machine or a cobalt-60 source, or in any other manner, such as by means of chemical curing agents which are effective at room temperature. If the organopolysiloxanes contain Si-bonded hydroxyl groups or groups which can be condensed with such groups, then chemical curing agents can be used to cure these compositions. Examples of these curing agents are silicon compounds which contain at least three Si-bonded groups per molecule, such as alkoxy, acyloxy, oxime and/or amino groups which can be condensed with SiOH groups. Other curing agents are polyethyl silicates, or silicon compounds which have at least three Si-bonded hydrogen atoms per molecule, such as methylhydrogenpolysiloxanes. In most cases condensation catalysts, such as lead octoate, dibutyltin dilaurate, tin octoate and iron octoate are also employed to accelerate the curing rate. If the organopolysiloxanes contain alkenyl groups, for example vinyl groups, then Si-bonded OH groups are not essential in order to achieve an effective cure. The curing can also be effected, for example, by means of silicon compounds having at least three Si-bonded hydrogen atoms per molecule, in combination with platinum catalysts.

If the compositions of this invention are used in the manufacture of insulating tapes, this can be effected in any desired manner, such as by pressing or extruding into the desired configuration and thereafter cured. The resulting article can be cured by a two step curing process; first a pre-curing step and then a final curing step such as is frequently the practice in the manufacture of self-adhering elastomers.

One of the advantages of the compositions of this invention is that self-adhering elastomers may be prepared by the so-called "shock vulcanisation," i.e., curing or pre-curing by briefly subjecting the compositions which contain radical-forming agents to temperatures of from 250°C. to 300°C. or above, without the loss of boron from the compositions.

Other advantages of the compositions of this invention are that the boron containing compounds are non-toxic; they are not easily ignited, for example by an electrostatic charge; the concentration of boron in the composition is constant even when subjected to elevated temperatures during processing and curing and no agglomerates are formed during processing which produce the so-called "nibs," i.e., areas of different optical density and varying electrical insulation properties.

Surprisingly, articles, such as insulating tapes, which have been manufactured from these boron-containing compositions retain their self-adhesive properties for a prolonged period even on storage without exclusion of water, and on being wrapped around electrical conductors or other articles in an overlapping manner, adhere more rapidly, even at room temperature than do similar compositions previously known in the art.

Bouncing putties can be manufactured from the compositions of this invention by reacting the organopolysiloxanes with the mixed oxides, preferably in the presence of a catalyst and at a temperature of from 40°C. to 250°C., to give borosiloxanes. The catalyst may be neutralized with, for example, an ammonium salt of carbonic acid, if desired, and the resulting product is then mixed with a filler and other additives, if desired, such as oleic acid and the like.

The embodiments of this invention are further illustrated by the following examples in which all parts are by weight unless otherwise specified.

The mixed oxides of boron with silicon used in the Examples was prepared in the following manner:

About 4.8 kg/hour of silicon tetrachloride and 1.2 kg/hour of boron trichloride are evaporated and burned in a combustion chamber, together with 1.5 m³/hour of air. The temperature in the combustion chamber is above 800°C. The pyrogenically produced mixed oxides formed in the gas phase are separated off via a cyclone and freed of the residual hydrogen chloride by heating to 200°C. The mixed oxides contain 82.5 percent by weight of $SiO_2$ and 17.5 percent by weight of $B_2O_3$. Thus the mixed oxides contain about 5 percent by weight of boron calculated as elemental boron, and have a surface area of about 180 m²/g, measured in accordance with the BET method.

EXAMPLE 1

About 100 parts of a diorganopolysiloxane containing about 99.9 mol percent of dimethylsiloxane units and 0.1 mol percent of vinylmethylsiloxane units, with one Si-bonded hydroxyl group on each of the terminal units and a viscosity of about $2 \times 10^6$ cs. at 25°C. are mixed on a two-roll mill with 8 parts of a methylpolysiloxane containing about 5 percent by weight of Si-bonded hydroxyl groups and having one Si-bonded hydroxyl group on each of the terminal units, 30 parts of silicon dioxide produced pyrogenically in the gas phase and having a surface area of about 200 m²/g measured in accordance with the BET method, about 10 parts of the mixed oxides of boron and silicon, 2 parts of red-brown iron oxide pigment (obtainable under the description "Iron oxide," from Messrs. Deutsche Gold- und Silber-Scheideanstalt, vorm. Roessler, Frankfurt/Main, West Germany) and 1.5 parts of a paste of equal parts of bis-2,4-dichlorobenzyl peroxide and trimethylsiloxy end-blocked dimethylpolysiloxane having a viscosity of about 250 cs. at 25°C.

The mixture thus obtained is stored for 8 days, then shaped by extrusion into a tape 25 mm wide and 1 mm thick, and subjected to "shock vulcanisation" by means of hot air at 250°C. The rubbery-elastic insulating tape thus obtained adheres, after being wound in an overlapping manner onto an electrical conductor, within 5 minutes at room temperature to form a homogenous coating.

EXAMPLE 2

About 200 parts of a dimethylpolysiloxane containing one Si-bonded hydroxyl group on each of the terminal units and having a viscosity of about 100 cs. at 25°C. are mixed with 15 parts of the mixed oxide of boron with silicon and 0.01 part of anhydrous iron-III chloride in a paddle kneader with sigma-shaped paddles and warmed for 5 hours to 100°C. while continuing to knead.

After cooling, about 200 parts of the highly viscous borosiloxane thus obtained are mixed on a two-roll mill with 1 part of oleic acid and 30 parts of silicon dioxide produced pyrogenically in the gas phase, having a surface area of 150 m²/g measured in accordance with the BET method. An excellent bouncing putty is obtained.

Although specific examples of the invention have been described herein, it is not intended to limit the invention solely thereto but to include all variations and modifications falling within the spirit and scope of the appended claims.

What is claimed is:

1. A composition comprising an organopolysiloxane in which at least about 80 percent by weight of the organopolysiloxane is a diorganopolysiloxane of the formula

$$(HO)_x(SiR_yO_{4-y/2})_n H$$

in which R is selected from the group consisting of monovalent hydrocarbon radicals, halogenated monovalent hydrocarbon radicals and cyanoalkyl radicals, $n$ is an integer of at least 3, $x$ has an average value of from 0.99 to 1.01, $y$ has an average value of from 1.99 to 2.01, and the sum of $x + y$ is 3 and pyrogenically produced mixed oxides of boron and an element selected from the class consisting of silicon, aluminum, titanium and iron, said mixed oxides containing from 2 to 20 percent by weight of boron calculated as elemental boron, said mixed oxides being present in an amount of from 0.005 to 20 percent by weight of boron based on the weight of the organopolysiloxane.

2. The composition of claim 1, wherein the mixed oxides contain from 5 to 10 percent by weight of boron calculated as elemental boron.

3. The composition of claim 1, wherein the mixed oxides are boron and silicon oxides.

4. The composition of claim 1, wherein the mixed oxides are obtained by the flame hydrolysis technique.

5. The composition of claim 1, wherein the boron calculated as boric acid anhydride is present in an amount of from 0.005 to 0.09 percent by weight, based on the weight of organopolysiloxane.

6. The composition of claim 1, wherein the boron calculated as elemental boron is present in an amount of from 0.005 to 20 percent by weight, based on the weight of organopolysiloxane.

7. The composition of claim 1, wherein n has a value of at least 50.

8. The composition of claim 1, wherein some of the hydroxyl groups have been replaced by groups which can be condensed with SiOH groups.

9. The composition of claim 1, wherein at least 50 percent of the number of R radicals are methyl radicals.

10. The composition of claim 9, wherein the remaining R radicals are selected from the class consisting of phenyl and vinyl radicals.

11. The composition of claim 1, wherein the viscosity of the organopolysiloxane is from 100 to $10 \times 10^6$ cs. at 25°C.

12. The composition of claim 1, which also includes a cross-linking agent.

13. The composition of claim 1, which also includes a curing agent.

14. A method for preparing a composition having a high degree of elasticity which comprises mixing at a temperature up to about 100°C. an organopolysiloxane in which at least about 80 percent by weight of the organopolysiloxane is a diorganopolysiloxane of the formula

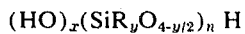

in which R is selected from the group consisting of monovalent hydrocarbon radicals, halogenated monovalent hydrocarbon radicals and cyanoalkyl radicals, $n$ is an integer of at least 3, $x$ has an average value of from 0.99 to 1.01, $y$ has an average value of from 1.99 to 2.01, and sum of $x + y$ is 3 with pyrogenically mixed oxides of boron and an element selected from the class consisting of silicon, aluminum, titanium and iron, in which the boron calculated as elemental boron is present in an amount of from 2 to 20 percent by weight based on the organopolysiloxane and the mixed oxides are present in an amount of from 0.005 to 20 percent by weight of boron based on the weight of the organopolysiloxane, to form borosiloxanes and thereafter adding sufficient filler to form a putty-like composition.

15. The method of claim 14, wherein the organopolysiloxane and the mixed oxides are combined with a catalyst, and a curing agent and thereafter formed into the desired configuration before heating to a temperature up to about 300°C. to partially cure the composition.

16. The method of claim 14, wherein the mixed oxides are boron and silicon oxides.

* * * * *

UNITED STATES PATENT AND TRADEMARK OFFICE
CERTIFICATE OF CORRECTION

PATENT NO. : 3,855,171
DATED : December 17, 1974
INVENTOR(S) : Karl-Heinrich Wegehaupt et al It is certified that error appears in the above-identified patent and that said Letters Patent are hereby corrected as shown below:

> Page 1, column 1; following the filing date,
> insert ------Claims priority, Germany, May 4,
> 1971, P 21 22 066.6-----

Signed and Sealed this fifth Day of August 1975

[SEAL]

Attest:

RUTH C. MASON
Attesting Officer

C. MARSHALL DANN
Commissioner of Patents and Trademarks